(12) United States Patent
Hensley et al.

(10) Patent No.: US 6,610,441 B2
(45) Date of Patent: Aug. 26, 2003

(54) ANNULAR PACK

(75) Inventors: Donald E. Hensley, Sugar Land, TX (US); Stuart Schaaf, Houston, TX (US); Marvin Milewits, Sugar Land, TX (US); Fraser Walsh, Winchester, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 223 days.

(21) Appl. No.: 09/803,444

(22) Filed: Mar. 9, 2001

(65) Prior Publication Data

US 2002/0012837 A1 Jan. 31, 2002

Related U.S. Application Data

(62) Division of application No. 09/209,912, filed on Dec. 11, 1998, now Pat. No. 6,280,874.

(51) Int. Cl.[7] .............................. H01M 2/02; H01M 2/08
(52) U.S. Cl. .................. 429/163; 429/161; 429/164; 429/174; 429/184
(58) Field of Search .................. 429/9, 55, 161, 429/163, 164, 174, 181, 184

(56) References Cited

U.S. PATENT DOCUMENTS

| | | | | |
|---|---|---|---|---|
| 4,053,692 A | * | 10/1977 | Dey | ........................ 429/174 X |
| 4,436,168 A | | 3/1984 | Dismukes | |
| 4,592,432 A | | 6/1986 | Williams et al. | |
| 4,603,095 A | * | 7/1986 | Bowsky | ........................ 429/181 |
| 4,794,056 A | * | 12/1988 | Pedicini | ...................... 429/66 X |
| 4,833,049 A | * | 5/1989 | Teaford et al. | ............. 429/181 |
| 4,879,187 A | * | 11/1989 | Biegger | ........................ 429/161 |
| 5,047,068 A | * | 9/1991 | Stoklosa | ...................... 429/66 X |
| 5,212,026 A | * | 5/1993 | Mitchell | ................ 429/163 X |
| 5,462,820 A | * | 10/1995 | Tanaka | ........................ 429/174 |
| 5,474,859 A | * | 12/1995 | Takeuchi et al. | ............ 429/161 |
| 6,020,086 A | * | 2/2000 | Van Lerberghe | ........ 429/164 X |

FOREIGN PATENT DOCUMENTS

| | | |
|---|---|---|
| GB | 2299598 | 10/1996 |
| GB | 2306528 A | 5/1997 |

* cited by examiner

Primary Examiner—Stephen Kalafut
(74) Attorney, Agent, or Firm—Trop, Pruner & Hu PC; Jeffrey Griffin; Brigitte Jeffery

(57) ABSTRACT

An annular pack for a cylindrical member for use in a wellbore includes a housing adapted to be mounted about an exterior circumference of the cylindrical member. The housing has mutually engagable annular segments. At least one of the annular segments defines a chamber for housing an electrical device.

28 Claims, 18 Drawing Sheets

ANNULAR PACK

This application is a divisional of U.S. application Ser. No. 09/209,912, filed Dec. 11, 1998 now U.S. Pat. No. 6,280,874.

BACKGROUND OF THE INVENTION

1. Technical Field

The invention relates generally to annular packs for use in a wellbore.

2. Background Art

Tools requiring electrical power are often used for conducting various operations in a wellbore. This creates a need for portable electrical power, preferably power that can be mounted directly onto a downhole tool. One way of providing electrical power downhole is through the use of a battery pack. Typically, the battery pack is constructed of rigid plastic, epoxy, fiberglass, or aluminum and is mounted on or inside a downhole tool. One or more annular cells or cylindrical cells are contained within the battery pack. The cells generally are immobilized inside the battery pack by an epoxy. In order to mount or dismount the annular battery pack onto the downhole tool, the tool may have to be disassembled. Disassembly of the tool makes replacing a battery pack time consuming and, in certain cases, is impossible at the job site. For quicker job turnaround, it is desirable that the battery be removable from the tool without use of specialized equipment not available at the job site.

SUMMARY OF THE INVENTION

In general, in one aspect, an annular pack for a cylindrical member for use in a wellbore has a housing adapted to be mounted about an exterior circumference of the cylindrical member having a plurality of mutually engageable annular segments. At least one of the segments defines a chamber for housing an electrical device.

In accordance with one or more embodiments of the invention, the annular pack may have a cell for providing electrical power. The cell for providing electrical power may be shaped to match a shape of the chamber. The shape of the chamber may be cylindrical. The shape of the chamber may match a shape of the segment having that chamber. Each of the segments may have an alignment key and a cut-out for mating a respective alignment key on another segment. The segments may be electrically connected to one another when engaged. At least two of the segments may be electrically connected in parallel or series. A segment may have a plug for electrical connection to a tool. The segments may be electrically isolated from one another when engaged. The annular pack may include an electrical circuit disposed within the chamber.

In general, in one aspect, a power cell for mounting in an annular pack for providing power to a downhole tool, includes a housing having a top, bottom, and sides shaped to fit within a chamber in the annular pack, battery means for generating electricity disposed within the housing and a seal element arranged to provide a passage for electricity from the battery means through the housing.

In accordance with one or more embodiments of the invention, the power cell may include a strain relief tab within the housing for electricity connecting the battery means to the seal element. The seal element may be a glass seal integrally mounted in the cell. The power cell may include a lid, wherein the glass seal is integrally mounted in the lid. The seal element may be a glass-to-metal seal with a chamfered rim. The power cell may include a spring for biasing the battery means to one side of the housing under downhole conditions. The spring may be a C-shaped spring.

In general, in one aspect, a method of integrally forming a glass seal includes providing a lid for a cell, forming a hole in the lid, disposing a post surrounded by an annular layer of glass within the hole and heating the cell until the glass seals to the lid.

In general, in one aspect, a method of providing power to a downhole tool includes providing a housing adapted to be mounted about an exterior circumference of the cylindrical member having a plurality of mutually engageable annular segments. At least one of the segments defines a chamber. The method also includes placing a cell for producing power within the chamber, mounting the plurality of annular segments about the cylindrical member and providing power to the tool from the cell.

Other advantages and features will become apparent from the following description and from the appended claims.

DETAILED DESCRIPTION

Figure 1:
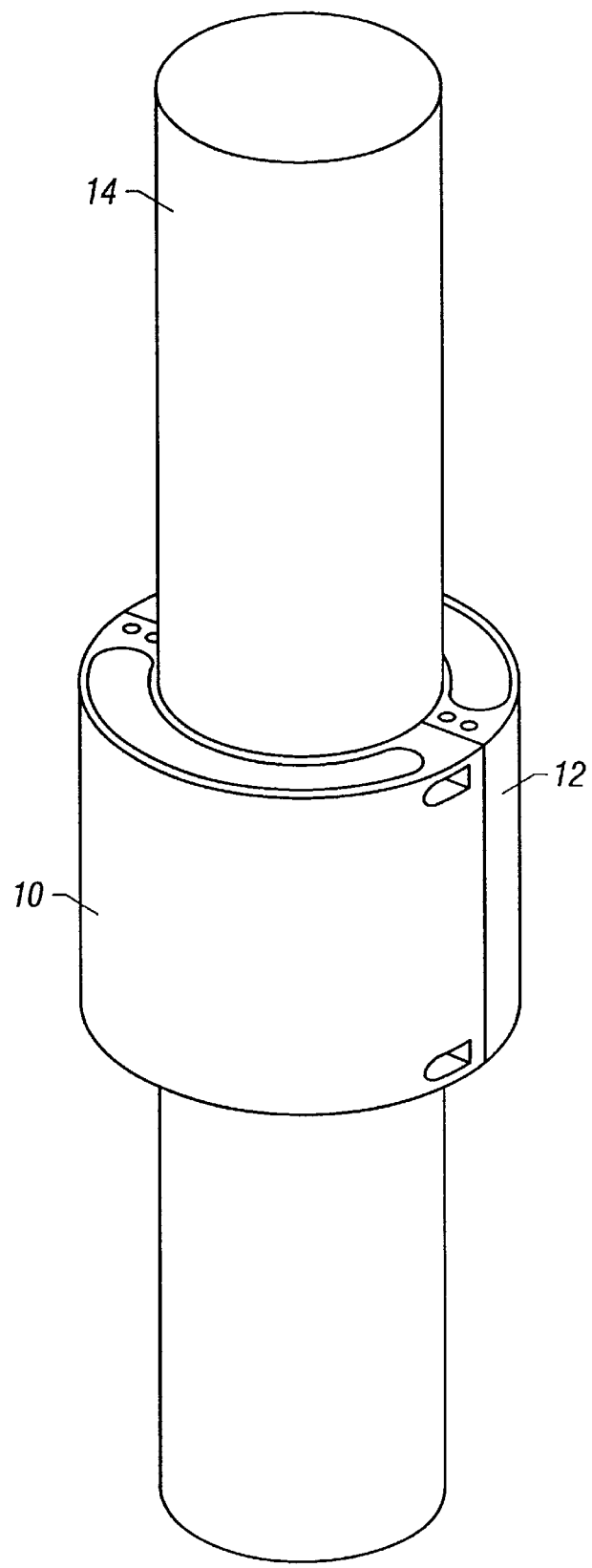
FIG. 1 shows a split annular battery pack mounted on a downhole tool.
Figure 2:
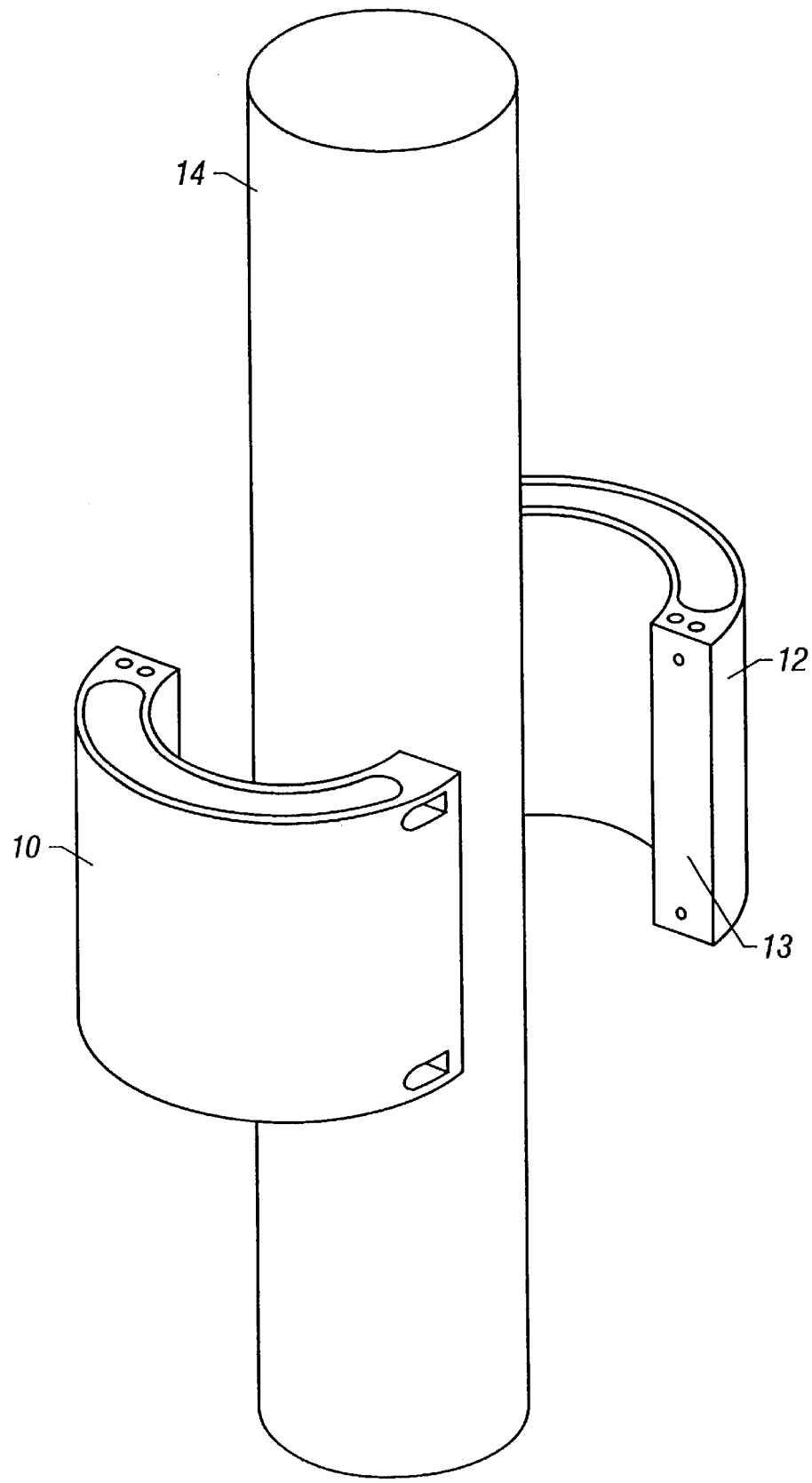
FIG. 2 shows the split annular battery pack of FIG. 1 disassembled.

Referring to the drawings wherein like characters are used for like elements throughout the several views, FIG. 1 illustrates a split annular battery pack assembled on a downhole tool in accordance with an embodiment of the invention. In this particular embodiment, the split annular battery pack is made up of two half packs 10 and 12 held together around downhole tool 14 as described with reference to FIG. 5 below. Tool 14 may be any type of tubular member designed for downhole use. Although two half packs are shown in this embodiment, a split annular pack may be made from three or more elements as well. FIG. 2 shows halves 10 and 12 disassembled and apart from downhole tool 14. The split battery pack design facilitates replacement of a battery on downhole tools at the job site. The split annular design can be used on any downhole tool including, for example, logging while drilling ("LWD") tools and measuring while drilling ("MWD") tools. The design also is applicable to any sized wellbore diameter.

Figure 3:
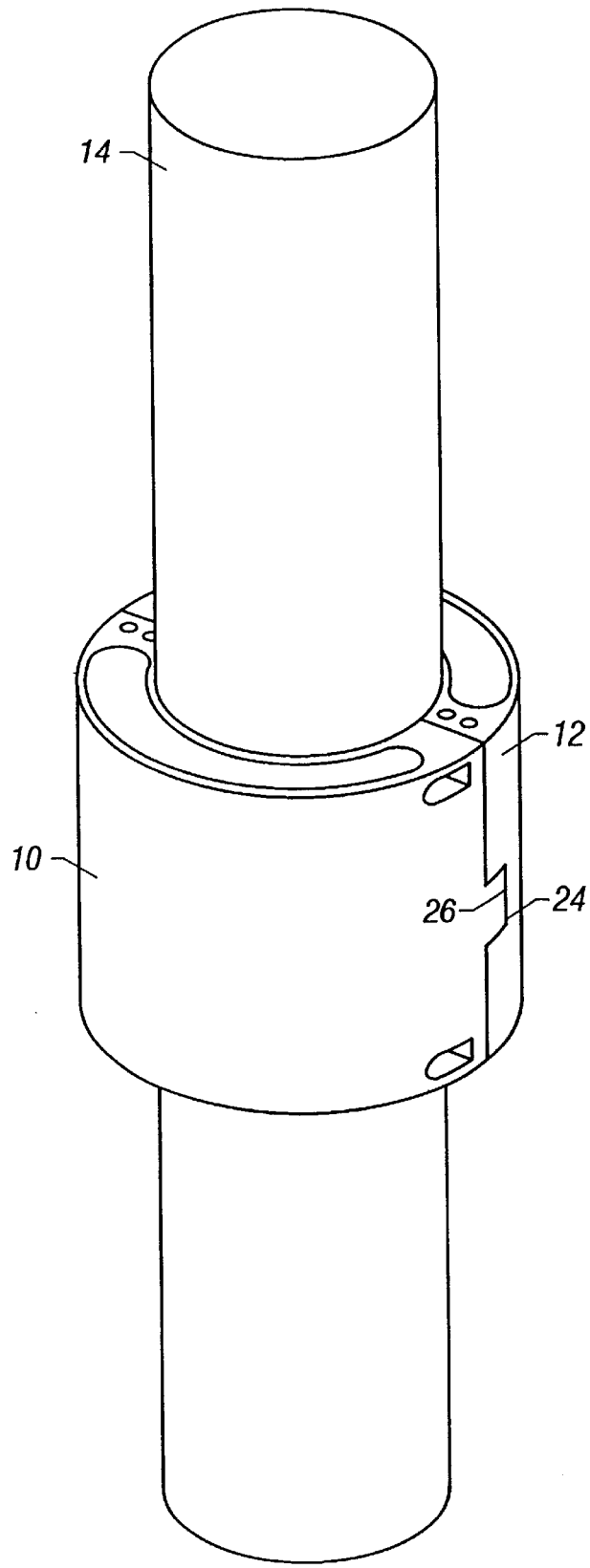
FIG. 3 shows a split annular battery pack mounted on a downhole tool having alignment mechanisms and respective cut-outs.
Figure 4:
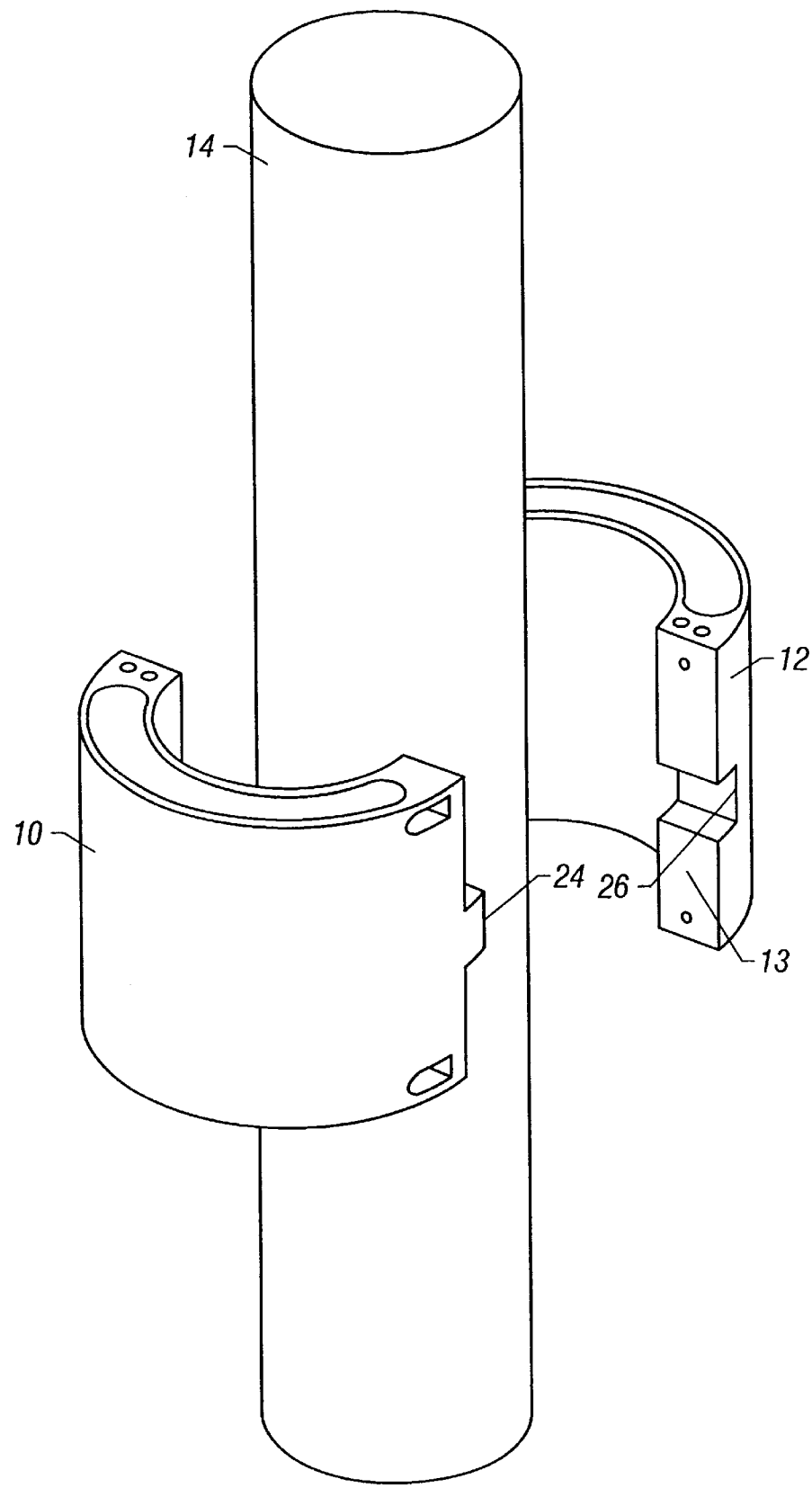
FIG. 4 shows the split annular pack of FIG. 3 disassembled.

In one embodiment, to ensure proper alignment, faces 13 of the split battery pack are provided with alignment mechanisms 24 and respective cut-outs 26 to facilitate alignment of both halves as shown in FIG. 3. Alignment mechanisms 24 are shown to be rectangular keys, but can take any shape or size as may be required by a given application. FIG. 4 is an exploded view of the embodiment having alignment mechanisms 24 and respective cut-outs 26.

Figure 5:
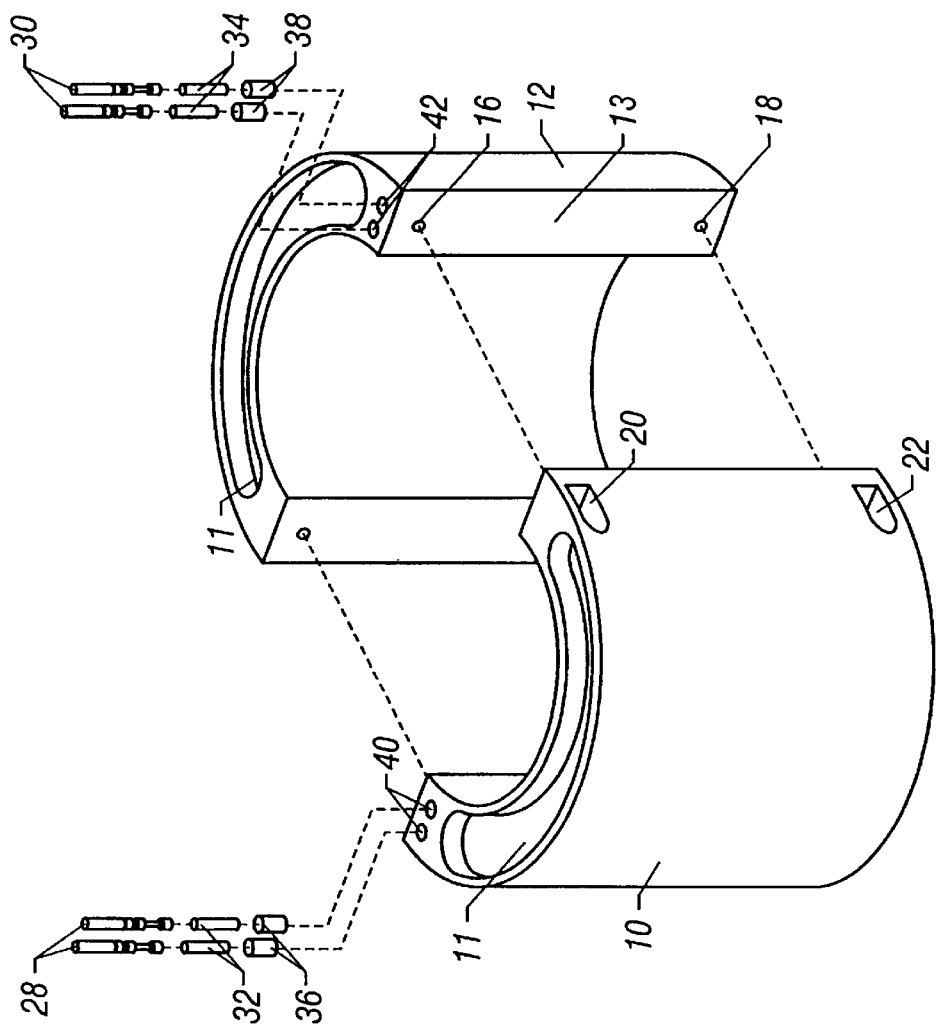
FIG. 5 shows an exploded view of one embodiment of the split annular battery pack with floating terminals.

When assembled on a tool, half packs 10 and 12 are secured to each other with four screws (not shown). Two screws engage holes 16 and 18 through cut-outs 20 and 22 on one side as shown in FIG. 5. The other two screws secure the other side in the same fashion. Inserts 32, isolating bushings 36 and floating positive and negative terminals 28 are inserted into holes 40 on top of pack half 10. Similarly, floating positive and negative terminals 30, inserts 34, and isolating bushings 38 are inserted into holes 42 on the top of half pack 12. Holes 40 may be located on the bottom or both the top and bottom of a split battery pack. Holes 42 may be located similarly. If the walls of the housing are thick enough, terminals can be located on the outer diameter ("OD") or inner diameter ("ID") of the cell.

Figure 6:
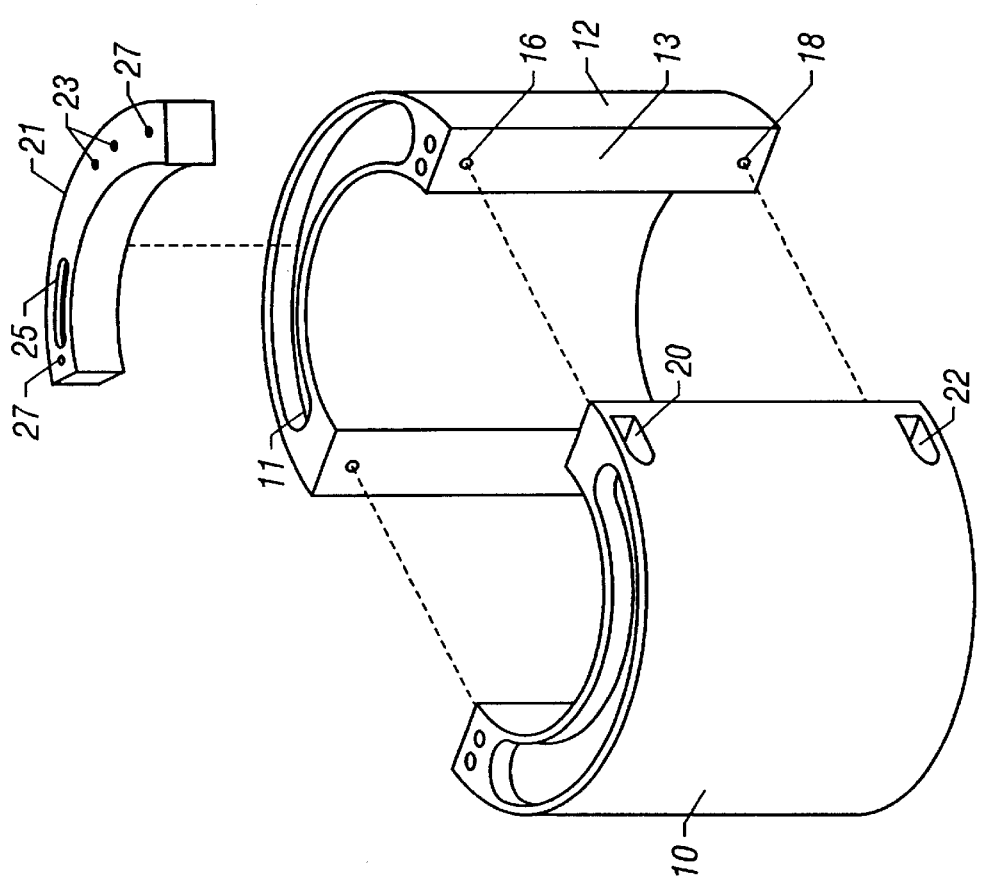
FIG. 6 shows an exploded view of one embodiment of the split annular battery pack with a contact block.

Alternatively, as shown in FIG. 6, a contact block 21 may be used instead of holes 40. Contact block 21 is curved so as to fit within a top portion of chamber 11 of half packs 10 and 12. While only one contact block 21 is shown in the figure, one may be provided in each chamber 11. Floating positive and negative terminals 28, 30, inserts 32, 34 and isolating bushings 36, 38 shown in FIG. 5, in the embodiment of FIG. 6 are disposed within holes 23. Chamber 25 houses a fuse (not shown). Chamber 25 allows the fuse to be more accessible and therefore easier to replace.

Figure 7:
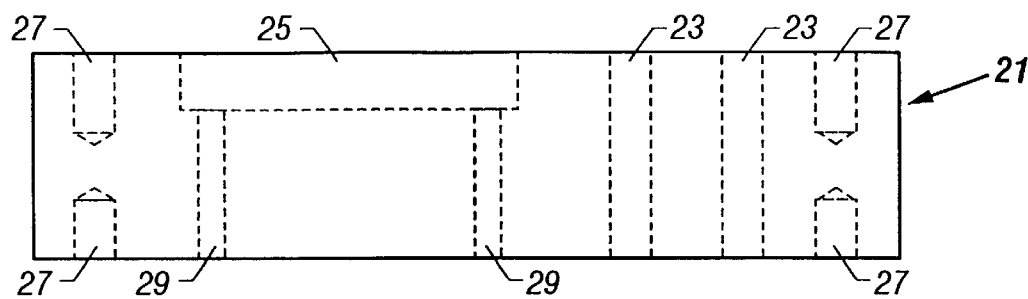
FIG. 7 shows a cross-sectional view of the contact block shown in FIG. 6.

An epoxy, mechanical mounting, or similar mechanisms may be used to secure the contact block in place. Generally, the contact block will be secured within the chamber so that the top of the contact block is flush with the top of the half pack. If an epoxy is used as the securing mechanism, contact block 21 may be connected to a flat member by screws (not shown) that engage holes 27. By placing the flat member onto half pack 10 or 12 during the curing of the epoxy, the top of the contact block is certain to be flush with the top of the half pack. FIG. 7 shows a cross sectional view of contact block 21. As can be seen in FIG. 7, holes 29 provide a path for electrical connections into chamber 23. Also, holes 27 are provided in both the top and bottom of contact block 21.

Figure 8:
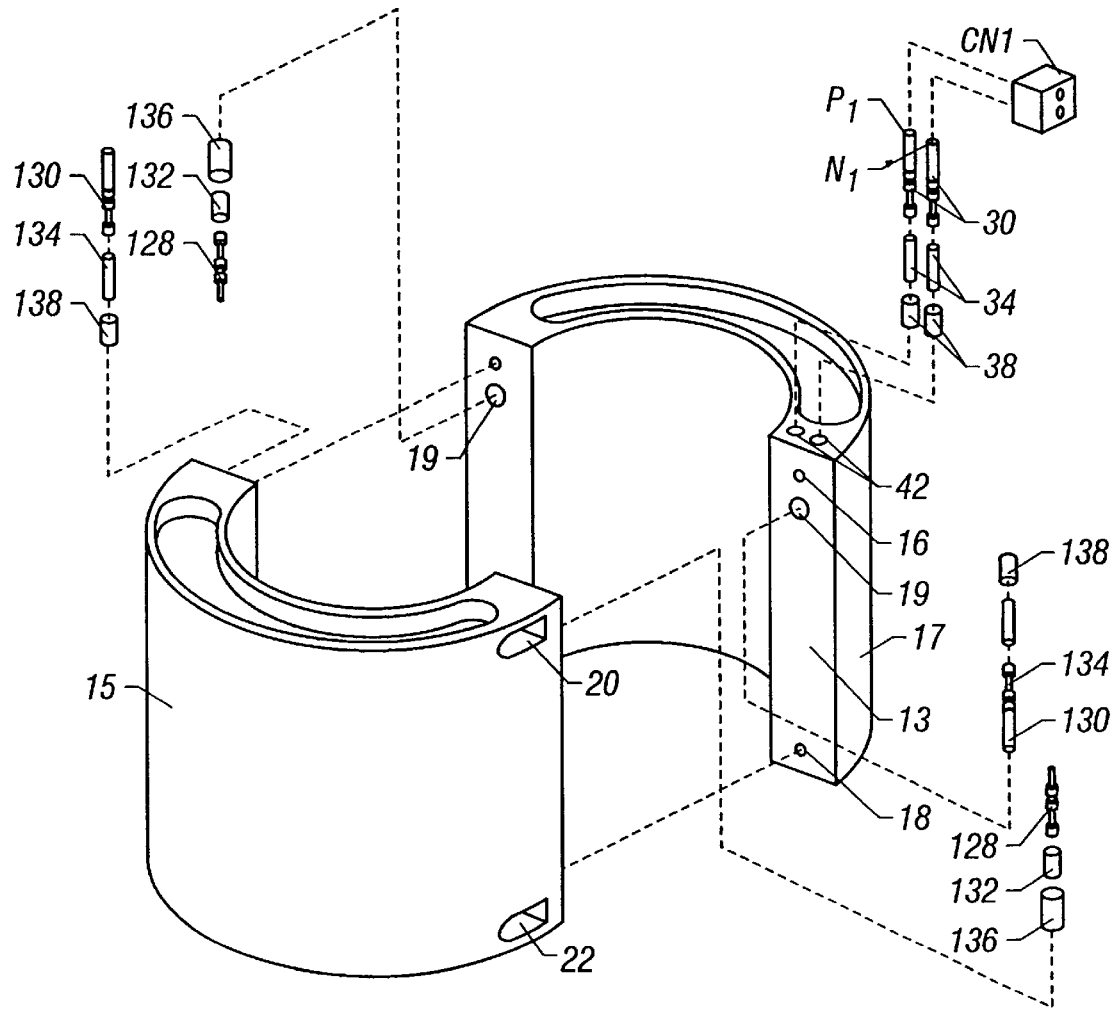
FIG. 8 shows an exploded view of the split annular pack in an embodiment having the half packs electrically connected.
Figure 9:
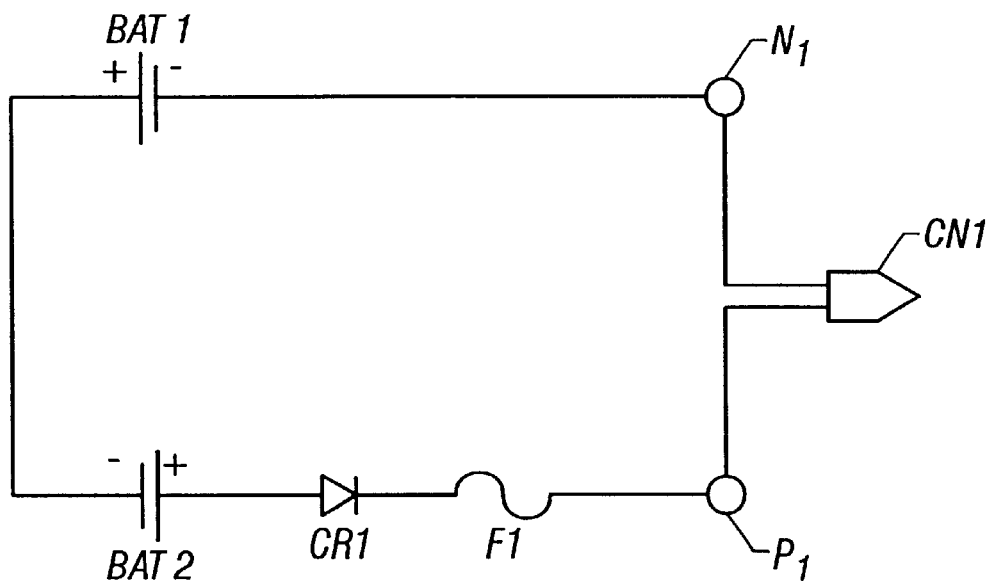
FIG. 9 is a schematic of the half packs electrically coupled in series.
Figure 10:
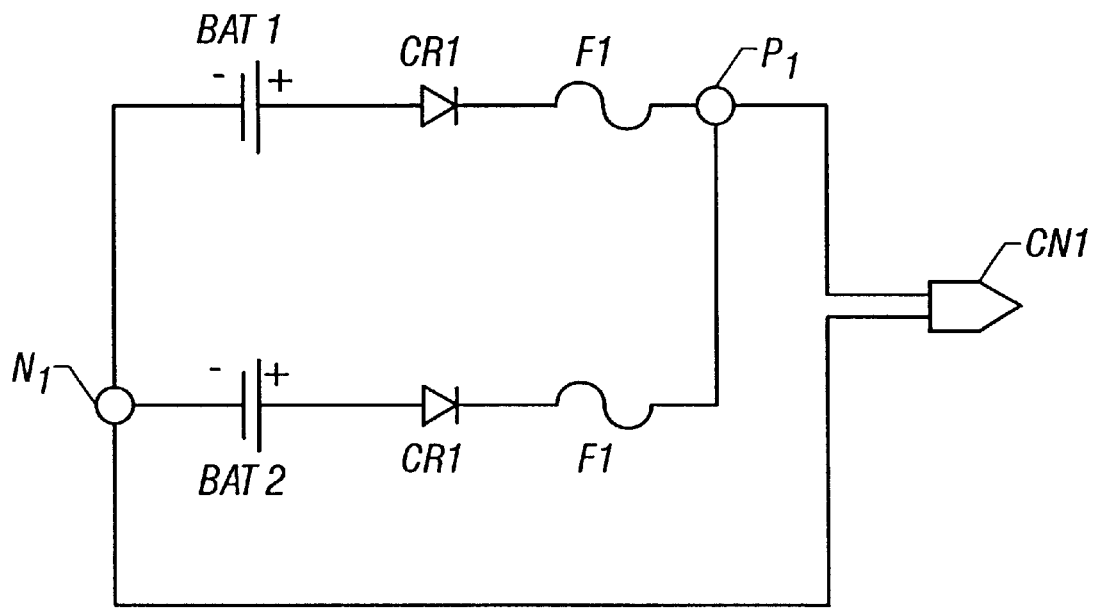
FIG. 10 is a schematic of the half packs electrically coupled in parallel.

Referring to FIG. 8, the half packs can be connected in series or parallel by mounting floating connections along the face 13 of the split section of each half pack 15, 17 so that electrical connections are established when the half packs are mated. Floating positive and negative terminals 128 and 130 are located in holes 19 and a complementary hole in half pack 15 (not shown) with inserts 132 and 134 and isolating bushings 136 and 138. Since both packs are electrically connected, floating positive and negative terminals 30 only need to be included on the top of half pack 17. As before, the floating terminals alternatively can be located on the bottom or on both the top and the bottom of the split battery pack, if desired. Also, if the housing is thick enough, the terminals can be located on the OD or ID of the cell. FIGS. 9 and 10 show schematics of the battery circuit in series and in parallel respectively. BAT1 and BAT2 denote batteries in the respective half packs. CR1 denotes a diode and $F_1$ denotes a fuse. In either embodiment, positive terminal $P_1$ and negative terminal $N_1$ are electrically coupled to a connector CN1 compatible with the equipment to be powered. Generally, the connector will consist of a receptacle capable of accepting a plug on electronics being powered. Alternatively, the terminals $P_1$ and $N_1$ may be directly electrically coupled with electronic equipment.

Figure 11:
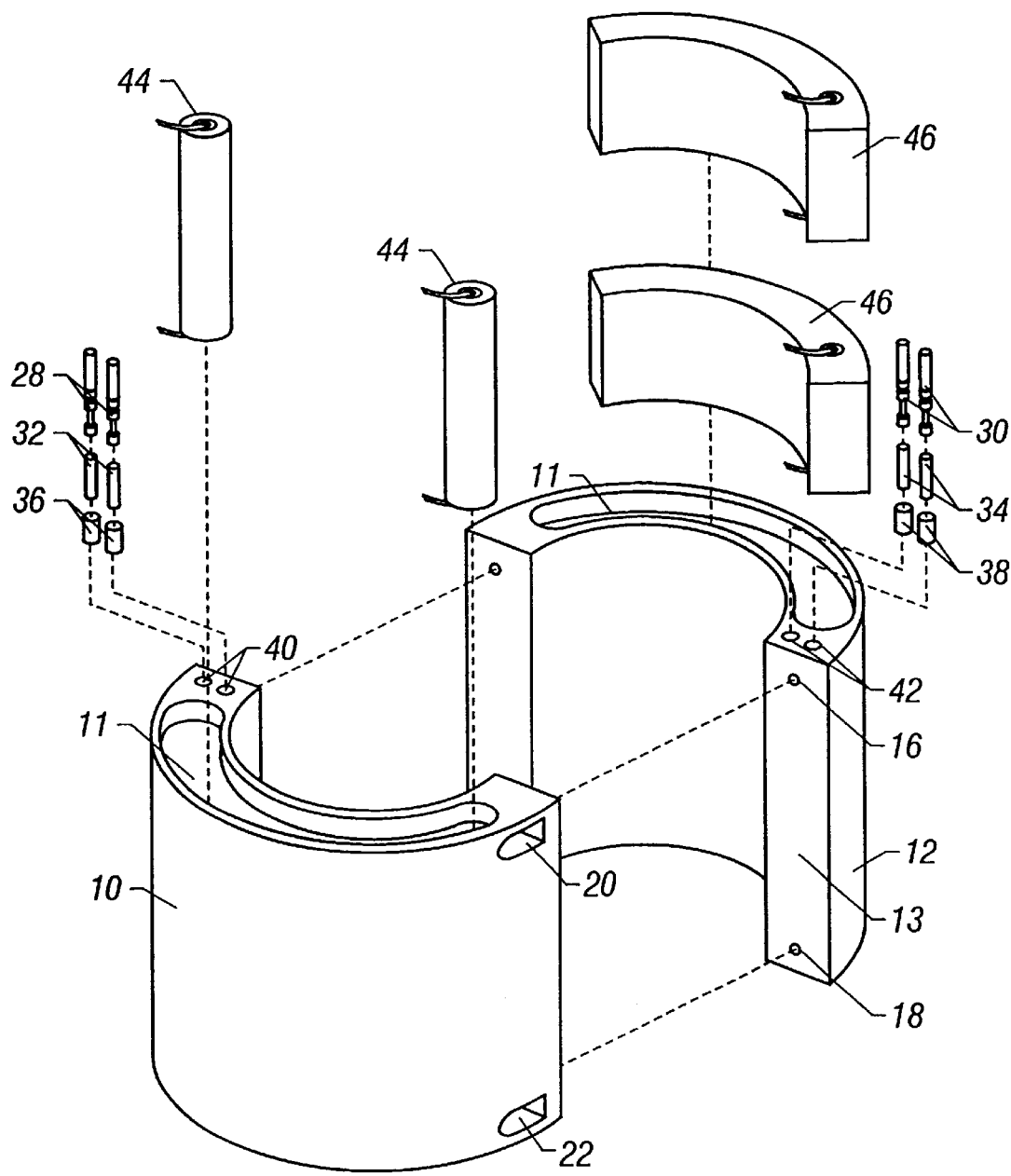
FIG. 11 shows an exploded view of the split annular pack with annular or cylindrical cells.

As shown in FIG. 11, each half pack of the split annular battery pack has an annular chamber 11. The chamber may be used to house any type of electrical device. In the embodiment shown, half pack 12 is shown to house split annular cells 46, while half pack 10 houses cylindrical cells 44. The cylindrical and split annular cells can be connected in series, in parallel, or a combination of both to achieve the desired voltage and capacity required to operate the tool. The cylindrical or split annular cells may be secured in place by means of epoxy or a mechanical means. In embodiments made up of more than two halves, every fractional part of the whole has such an annular chamber. The design of the annular cell allows the number of cells and cell-to-cell connections of a pack to be decreased. Also, the annular cell's efficient use of the space available inside a pack leads to greater battery capacity.

Figure 12:
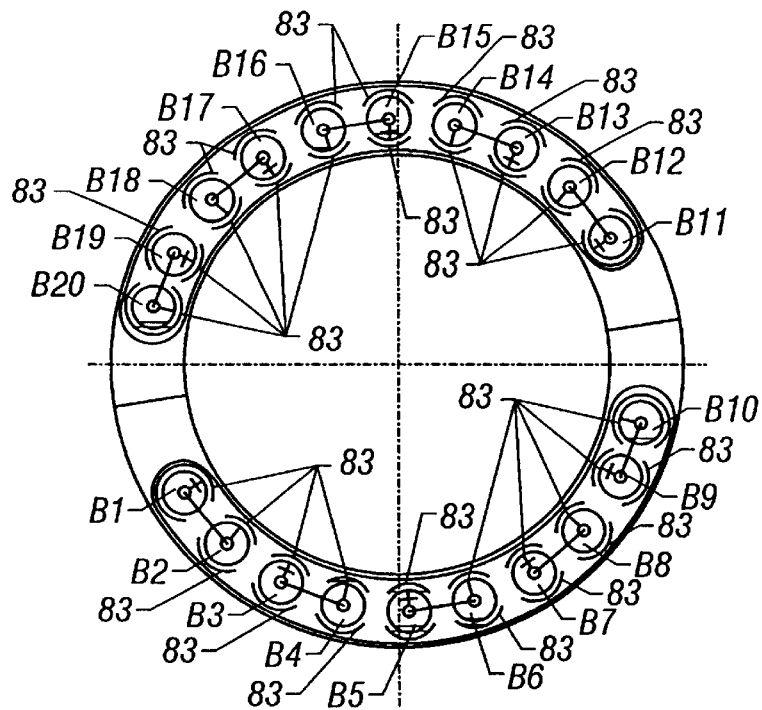
FIG. 12 shows a top view of the split annular pack with cylindrical cells electrically coupled in a combination of series and parallel connections.
Figure 13A:
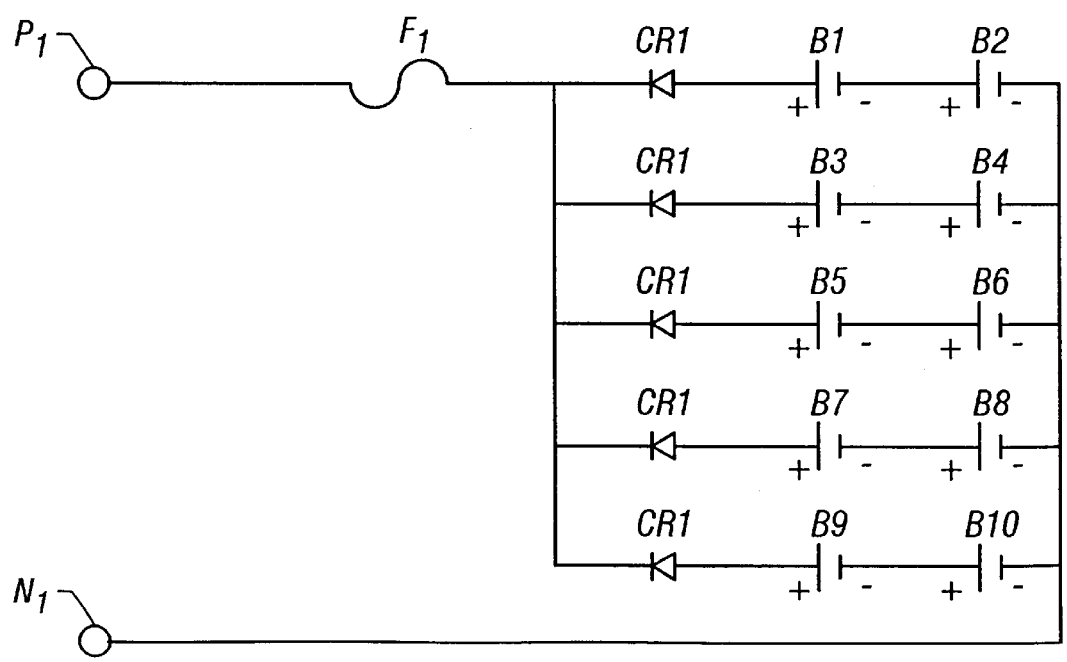
FIG. 13A is a schematic of one half pack shown in FIG. 12.
Figure 13B:
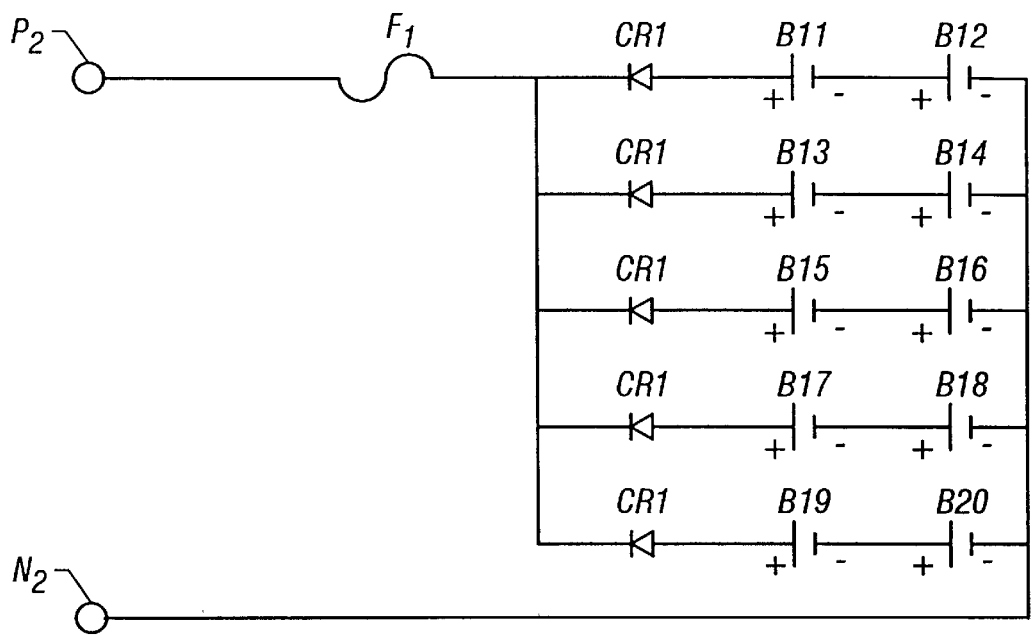
FIG. 13B is a schematic of the other half pack shown in FIG. 12.

The cells contained within the half pack are electrically connected to the terminals. The cells themselves may be connected to one another in series, parallel or a combination of both series and parallel. FIG. 12 shows view of cylindrical cells B1–B20 electrically connected to one another. Cells B1–B20 are electrically isolated from the half packs 10 and 12 by insulating material 83. Insulating material 83 will be described with reference to FIG. 19 below. In this embodiment, adjacent cells are connected in series in sets of two. The sets of series connected cells are then connected together in parallel. A diode is placed between the series connected cells and the parallel connection to protect the cells. Finally, the cells are electrically connected to the floating terminals through a fuse. FIGS. 13A and 13B shows a schematic of this embodiment. The ten cells contained within each half pack are denoted by B1–B20 respectively. CR1 refers to a diode and F1 refers to a fuse. The selection and purpose of CR1 and F1 are well known in the art and may differ given specific applications. Positive terminals $P_1$, $P_2$ and negative terminals $N_1$, $N_2$ may be connected as described above.

Figure 14:
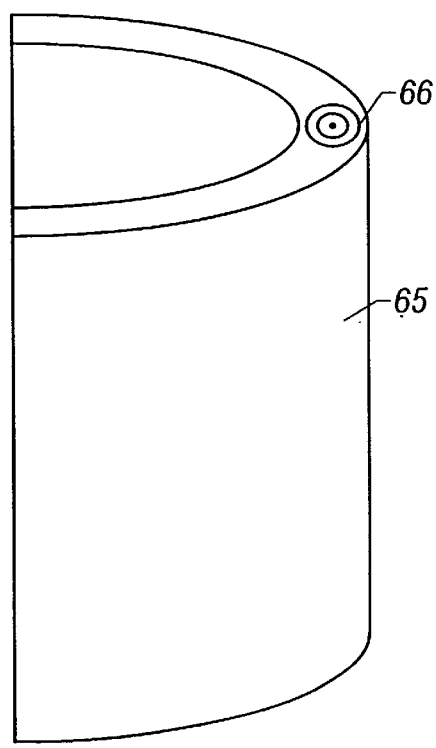
FIG. 14 shows a top-mounted glass-to-metal seal on a split annular cell.
Figure 15:
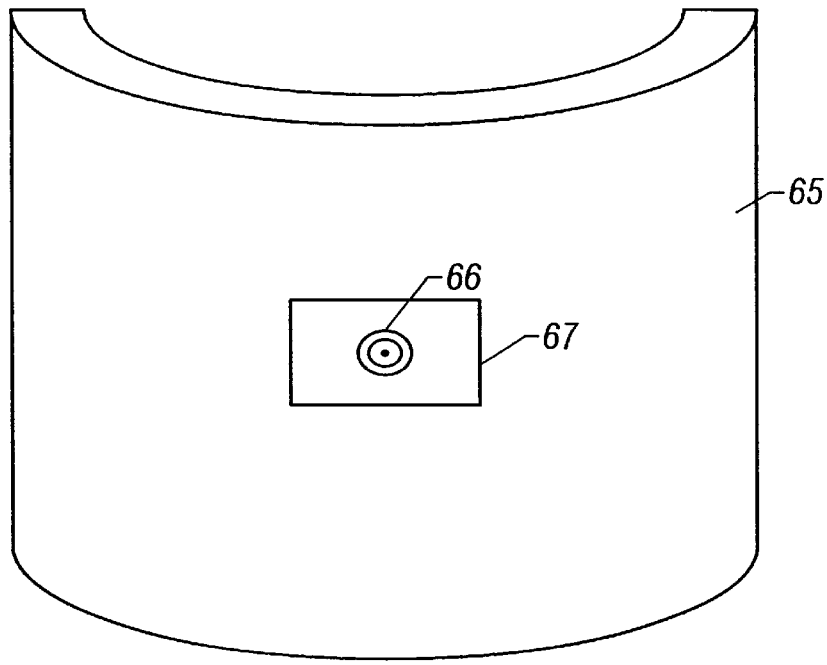
FIG. 15 shows a side-mounted glass-to-metal seal on a split annular cell.
Figure 16:
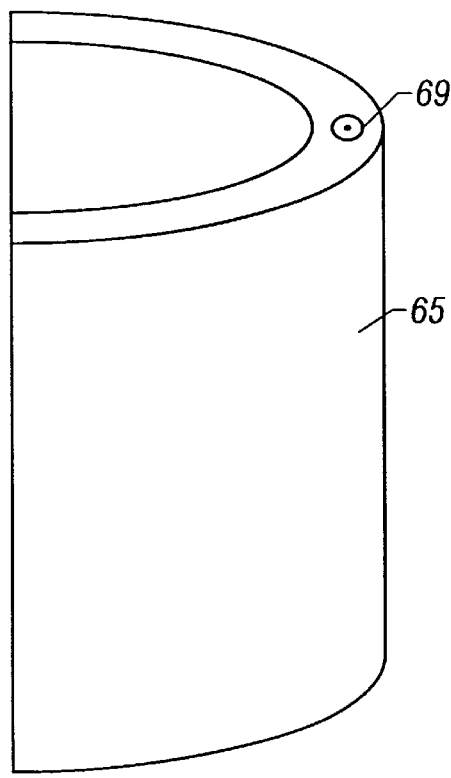
FIG. 16 shows a top mounted integral glass seal on a split annular cell.

Referring to FIGS. 14, 15 and 16, a split annular cell can use a glass-to-metal seal or an integral glass seal that is top-mounted or side-mounted. In any case, the seal may exist on one half as shown or on both halves (not shown) of the split annular cell. FIG. 14 illustrates a top-mounted glass-to-metal seal 66 on split annular cell 65.

The side-mounted glass-to-metal seal, shown in FIG. 15, is implemented due to the need for thin cross-sectional cells. Because the cross-sectional size of the walls of a cell are made thinner, welding a nominal sized glass-to-metal seal onto that cross-section becomes more difficult. This continues to the point where welding a commercially available glass-to-metal seal is impossible. Therefore, the glass-to-metal seals are placed on the OD of the cell can. This allows thin cross-sectional annular cells to be developed for use in downhole tools for use in a range of diameter wellbores. In order to place glass-to-metal seal 66 onto the side of annular cell 65, a portion 67 of the outer wall is flattened or dented. Portion 67 provides a flat surface on which the glass-to-metal seal can be mounted. Alternatively, the glass to metal seal could be placed on a flattened portion of the ID of the cell can in a similar manner.

Figure 17:
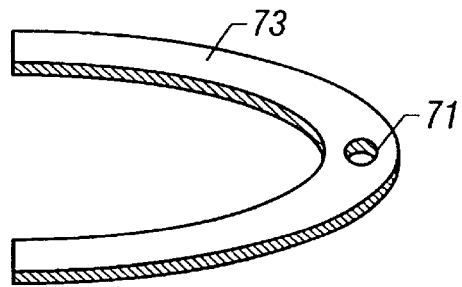
FIG. 17 shows the lid of the split annular cell of FIG. 16.

Referring to FIG. 16, an integral glass seal 69 is shown which does not require the outer metal ring used in the glass-to-metal seal. The integral glass-to-metal seal is disposed within the lid of the split annular cell. Referring to FIG. 17, the process of integrating a glass seal involves cutting or drilling a hole 71 in the lid of the split annular cell 73 and arranging the glass and post in the hole. The assembly is then placed in an oven and fired to fuse the glass and post to the lid of the split annular cell. The above process could also be implemented in an annular cell design. The integral glass seal establishes a reliable top-mount cell connection, alleviates heat distortion caused by laser welding, facilitates easier and quicker assembly, and allows the design and manufacture of thin cross-section annular or split annular cells.

Figure 18:
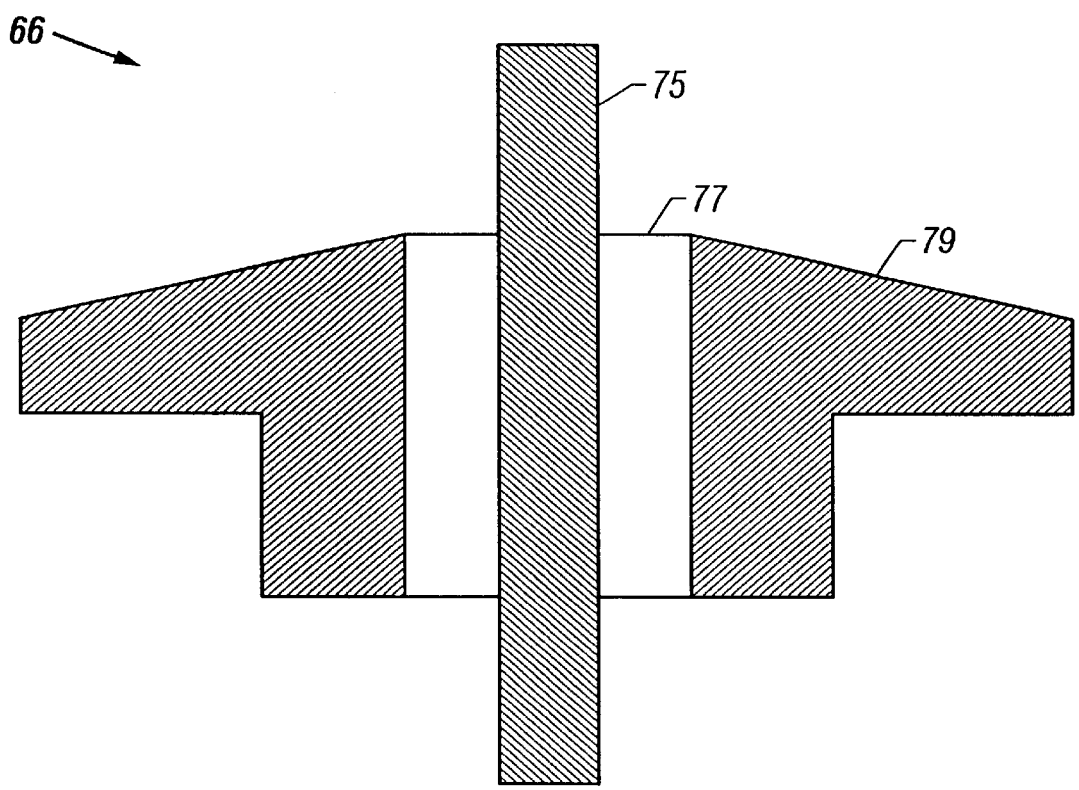
FIG. 18 shows a cross-sectional view of a chamfered glass-to-metal seal.

Various placements of the glass to metal seal 66 have been discussed in the preceding embodiments. Regardless of placement, the glass to metal seal 66 typically is welded in place using a welding process, for example a laser welding or resistance welding. When the glass to metal seal is welded to the can or one of the lids of a cell, excessive heat may be generated causing undesirable distortion of the seal and/or the cell surface. In addition to distortion, differing thermal expensivity characteristics of the seal and the can surface might result in leakage when excessive heating occurs. To minimize these problems and facilitate attachment of the glass to metal seal 66, an improved glass to metal seal 66 is illustrated in FIG. 18. In this seal center post 75 is surrounded by an insulating ring of glass 77. Disposed about glass ring 77 is a chamfered metal ring 79. Metal ring 79 may be made of any appropriate metal including, for example, steel. The chamfering of metal ring 79 reduces the actual amount of metal that is being laser welded by roughly two-thirds. Because less metal is being welded, the dwell time required to weld a part is reduced. The reduced dwell time consequently reduces the total heat required for the welding operation, this minimizing the risk of distortion and leakage.

Figure 19:
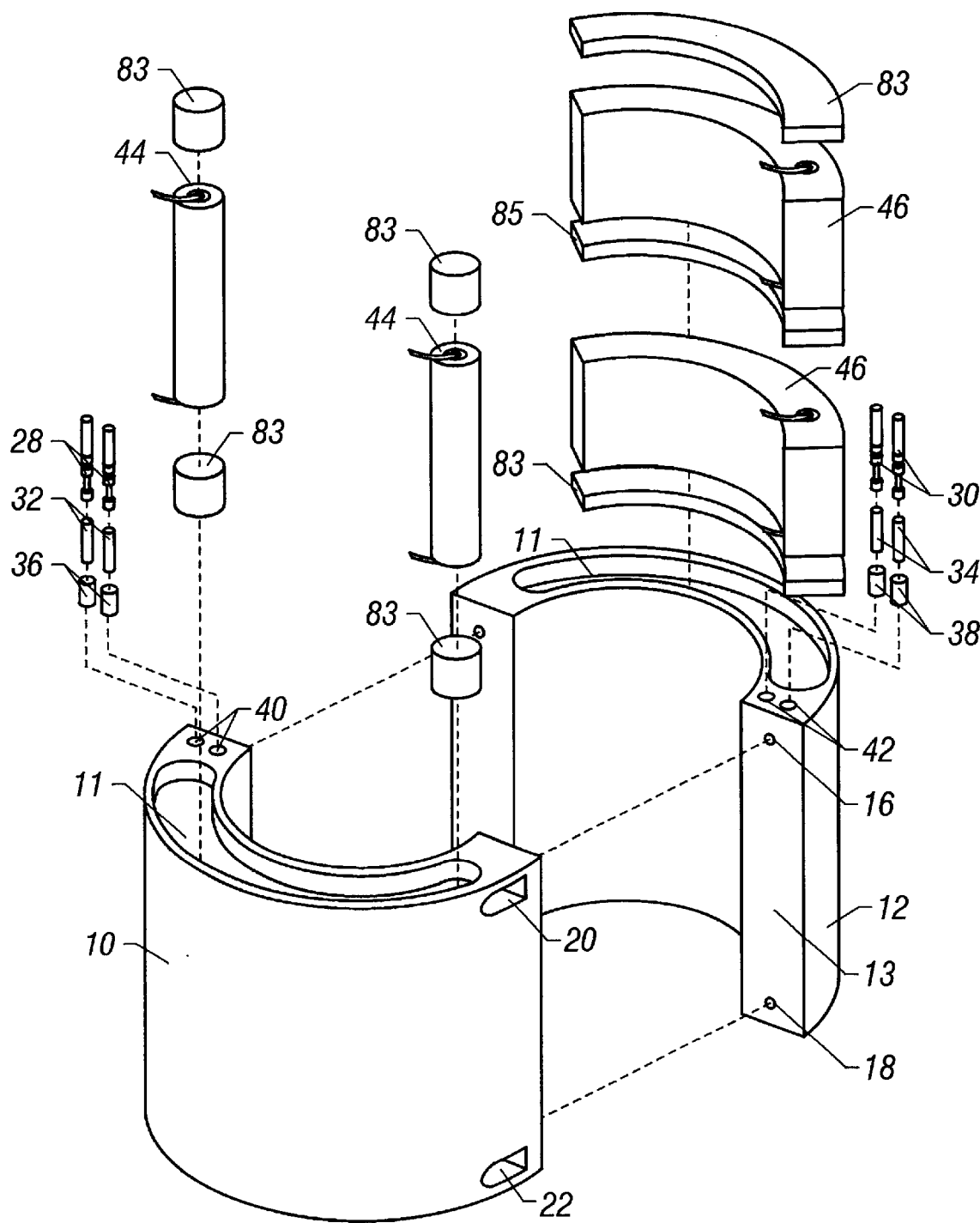
FIG. 19 shows an exploded view of the split annular pack with insulation layers.

Referring to FIG. 19, the cells are electrically connected to the floating terminals in the half pack. At the same time, the cells may be electrically isolated from the half pack. To accomplish this electrical isolation, an insulating material 83 is placed between the cell and the chamber of the pack as shown. Insulating material 83 may completely encapsulate the cell. Any size or shape insulator may be used to separate the cell from the half pack.

Several insulation alternatives exist, for example, the housing of the cell may be coated with a high temperature glass tape or non-conductive composite end caps may be used. The non-conductive end caps would fit into the top and bottom of chamber 11. The insulating material may be a false bottom, i.e., an insulating material poured into the chamber prior to the insertion of the cell. The epoxy securing a cell into chamber 11 may be used to electrically isolate the cell from the half pack. If an aluminum housing is used, another alternative is hard anodizing the housing. Several methods may be used in conjunction. Also, cells may be electrically isolated from one another by an additional insulating material 85. The placement of insulating layers within the half pack and the electrical connections of the half pack will be determined by application.

Figure 20:
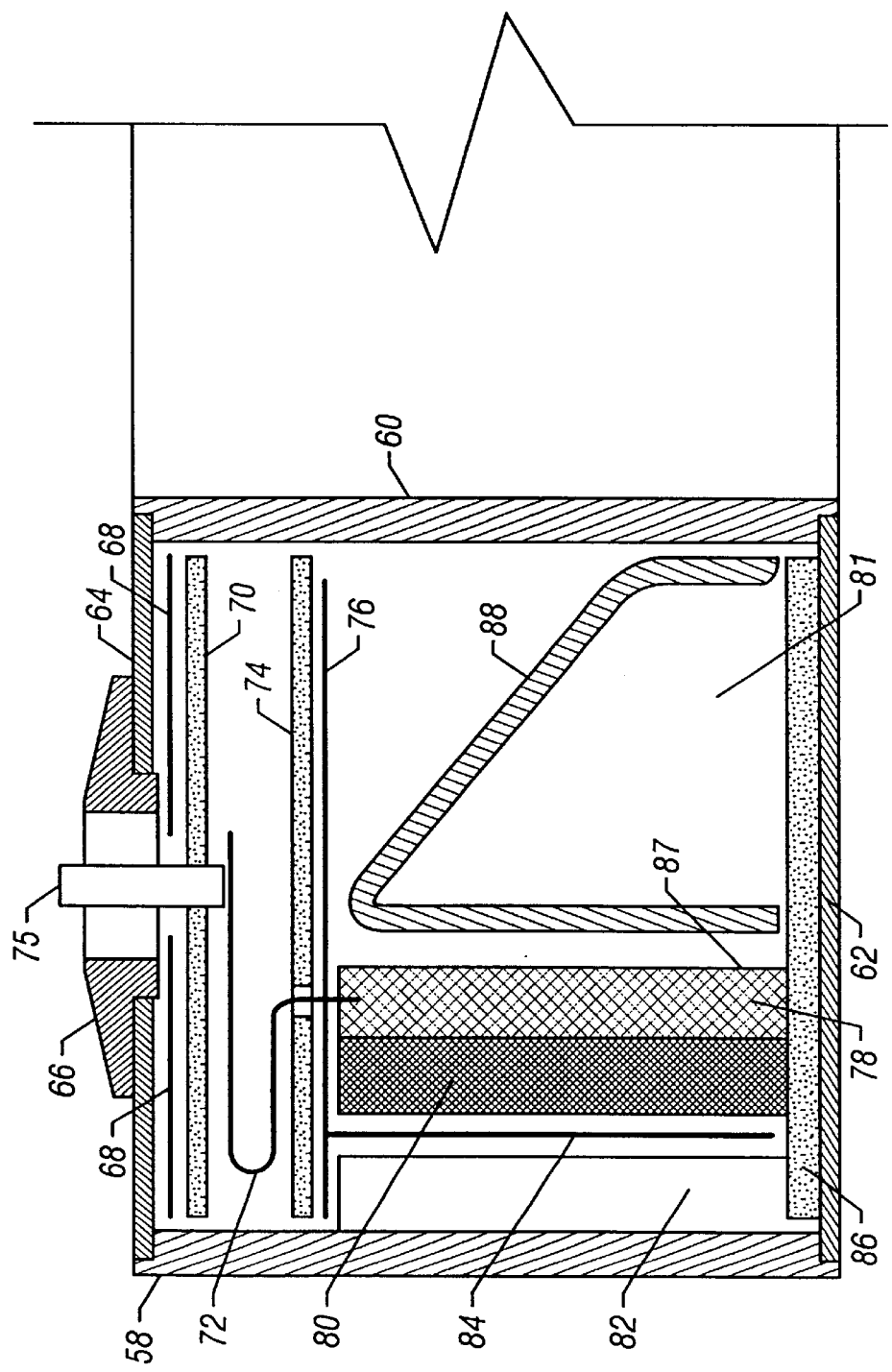
FIG. 20 shows a cross-sectional internal view of one half of an annular cell with a top-mounted glass-to-metal seal.

FIG. 20 illustrates a cross-sectional view of a top-mounted glass-to-metal seal on a split annular cell, such as cell 46 shown in FIG. 11. The split annular cell has an outer can sleeve 58, an inner can sleeve 60, a lower can lid 62, and an upper can lid 64. The top-mounted glass-to-metal seal 66 is mounted on upper can lid 64. Post 75 of the top-mounted glass-to-metal seal 66 passes through a sheet of separator paper 68 and an insulating disk 70 to make contact with tab 72. Tab 72 passes through a insulating disk 74 and a sheet of separator paper 76 to make contact with screen 78. In one or more embodiments, tab 72 may be adapted to include a strain relief loop between the insulating disks 70 and 74 as shown. The loop in tab 72 between insulating disks 70 and 74 increases the cell's ability to perform under downhole conditions. Screen 78 is disposed against carbon cathode 80. Separator paper 87 is placed on the opposite side of screen 78 from carbon cathode 80. An electrolyte 81, e.g., thionyl chloride, fills the interior of the cell. Those skilled in the art will appreciate that other electrolytes are suitable and may also be used. Generally, Teflon is used as an additional insulating material within the cell, for example, insulating disks 70 and 74 may be Teflon disks. Lithium anode 82 is disposed against the outer can sleeve 58 and separated from carbon layer 80 by a sheet of separator paper 84. An insulating disk 86 is placed between the interior elements of the cell and lower can lid 62. Finally, internal spring 88 is disposed within the cell to absorb shocks and maintain constant compression on the electrodes without incurring damage to the cell. The use of the internal spring allows the cell to operate at high shock levels, thus allowing the design to be used in hostile downhole environments. The internal spring may be "V" or "C" shaped. It will be understood by those skilled in the art that a "V" shaped spring also encompasses those shapes similar to a "V" shape, for example, "U", "W", "M", "N", "R", "Z", "Y", "X" shapes, and a "C" shape spring also encompasses those shapes similar to a "C" shape, for example, "O", "D", "G", "J", "P", "Q", "S", "B"shapes.

Figure 21:
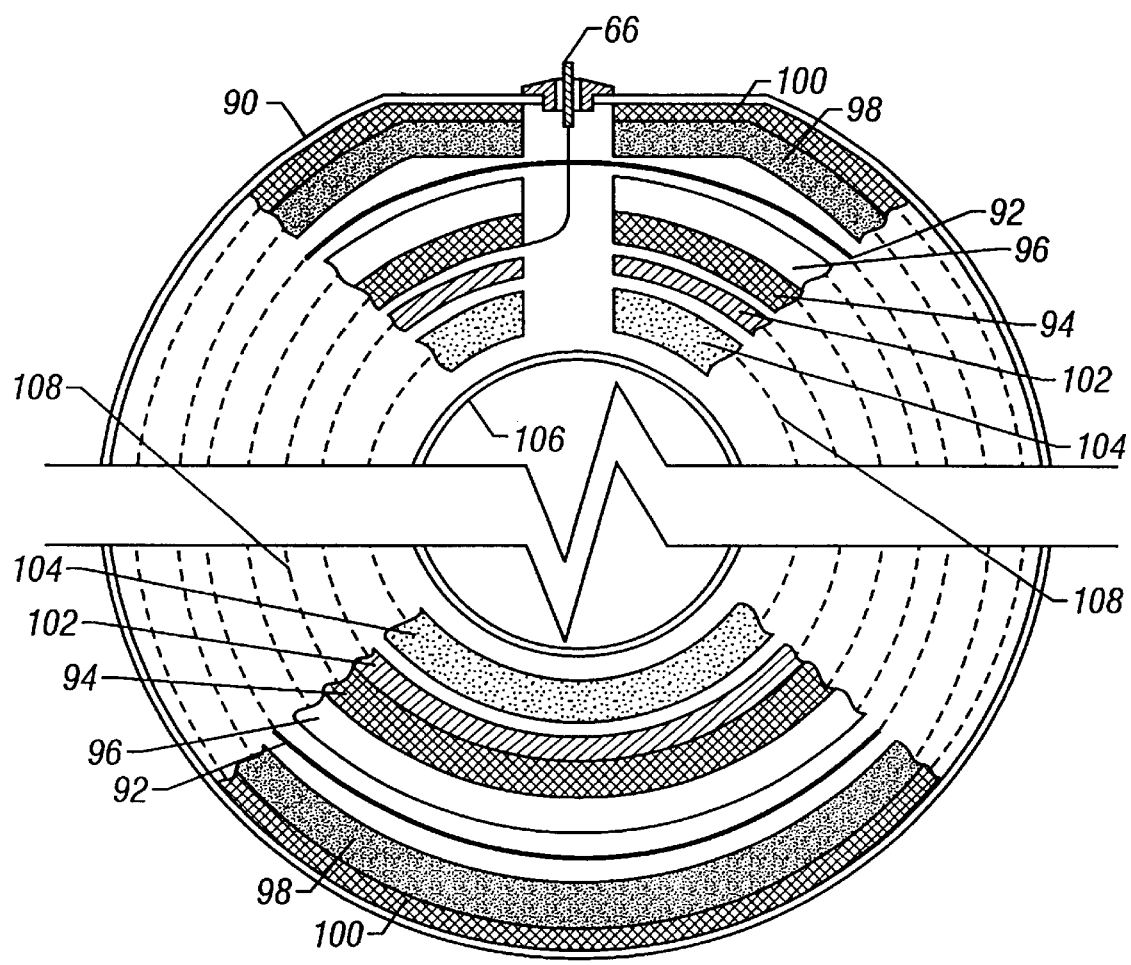
FIG. 21 shows a cross-sectional internal view of an annular cell with a side-mounted glass-to-metal seal.

Alternatively, as shown in FIG. 21, the glass-to-metal seal may be side mounted on the annular cell. In a side-mounted configuration, the glass-to-metal seal 66 is mounted on a flattened portion of outer can 90. The post of glass-to-metal seal 66 passes through separator paper 92 to contact screen 94. Adjacent to the opposite side of screen 94 is a layer of lithium 96. The lithium is isolated from carbon layer 98 by separator paper 92. Current collector screen 100 is placed between carbon layer 98 and outer can 90. Spring 102 borders screen 94 on the inner side where the post of glass-to-metal seal 66 makes contact. Spring 102 allows the cell to withstand shock without compromising performance by preventing internal components from moving and being shaken apart. Insulating layer 104 is disposed between spring 102 and inner can 106. An electrolyte, e.g., thionyl chloride 108, fills the interior of the cell to facilitate the electrochemical reaction that allows electricity production.

Figure 22:
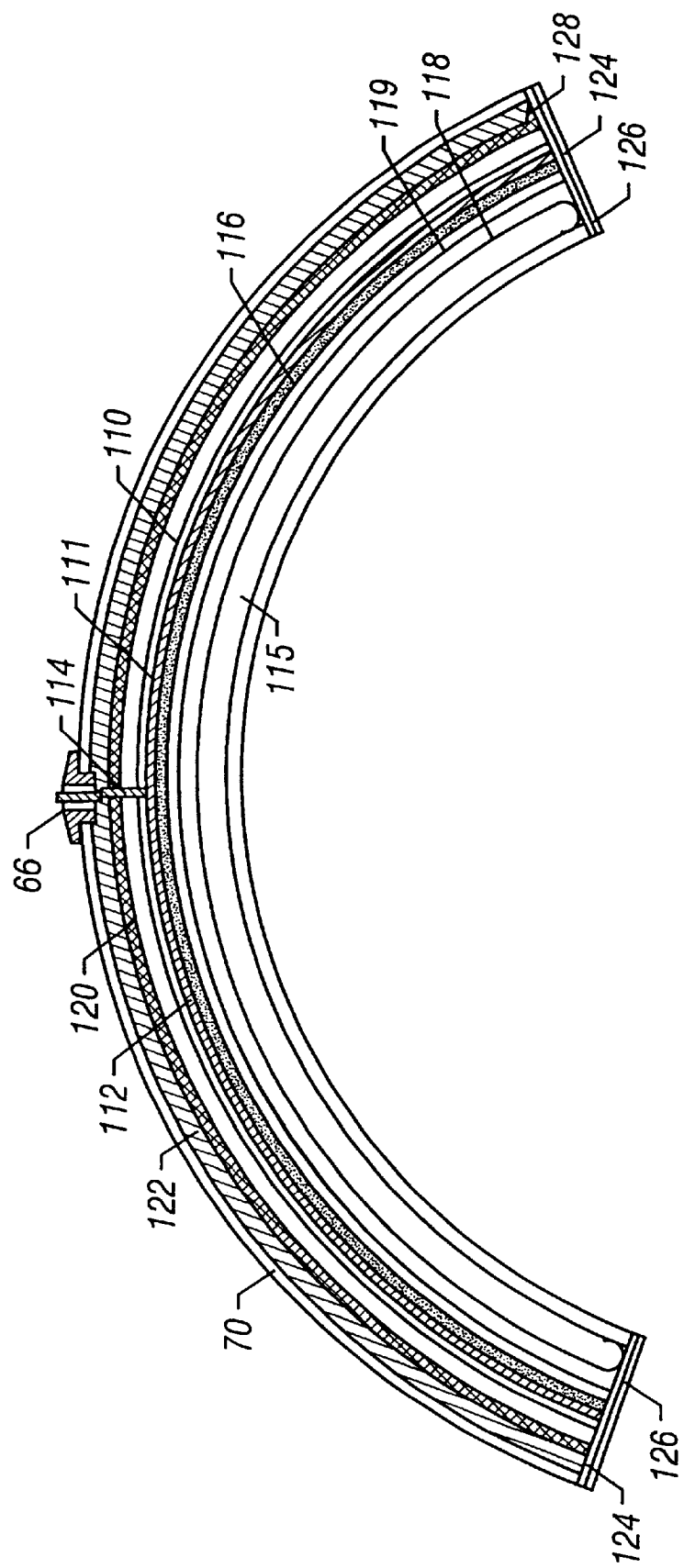
FIG. 22 shows a cross-sectional view of a split annular cell with a side-mounted glass-to-metal seal.

The split annular cell design is more economical and reliable to use in that the number of cell-to-cell connections required to obtain the desired capacity of the battery pack is reduced compared to cylindrical cells. At the same time, usage of the thin annular space available in the pack is more efficient than cylindrical cells. In most cases, this efficient use of available space yields higher battery capacity. FIG. 22 shows the internal structure of a split annular cell. In the illustrative embodiment shown, glass-to-metal seal 66 is side-mounted. Again, the glass-to-metal seal 66 is mounted on a flattened portion of outer sleeve 90. The post of glass-to-metal seal 66 passes through separator paper 110 to screen 112. Insulating shrink tubing 114 may be used on the connection tab 111 between glass-to-metal seal 66 and screen 112. Adjacent to the opposite side of screen 112 is a layer of lithium 116. The lithium is isolated from spring 118 by separator paper 119. Spring 118 provides radial constraining forces to the cell. Spring 118 may have, for example, a "C" or "V" shape. Screen 120 is placed between carbon layer 122 and separator paper 110. Insulating end layers 124 are placed in the splits in the annular cell bordered by outer end plates 126. Insulating disks are also placed on the top and bottom of the cell (not shown). The insulating disks are used to electrically separate components from one another and electrically insulate the anode and cathode from the outer can. In order to withstand shocks and vibrations present during operation, the insulating disks are made to a width of, for example, ten to fifteen thousandths of an inch. At one of the ends a tab 128 is provided against screen 120 to make the positive termination contact to steel can 90. An electrolyte 115, e.g., thionyl chloride, is placed throughout the interior of the cell to facilitate the chemical reaction that allows electricity production. All of the above designs are equally applicable to cells with other anodes. Further, certain environments may call for the use of a combination of materials, e.g., a lithium anode with magnesium added.

Figure 23A:
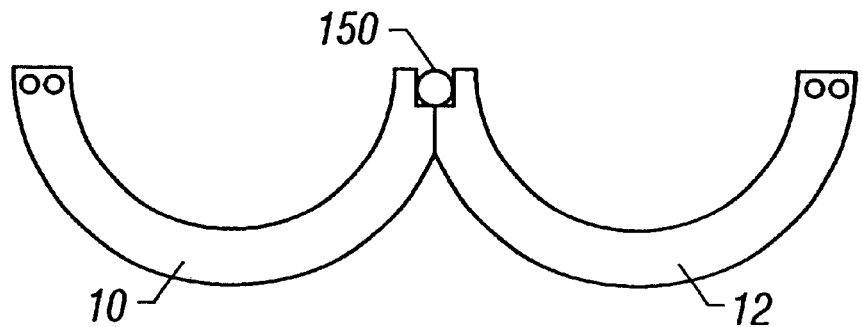
FIG. 23A shows a top view of a hinged split annular cell in an open position.
Figure 23B:
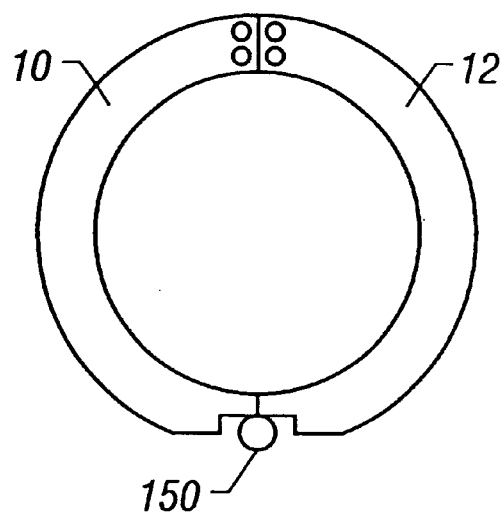
FIG. 23B shows a top view of a hinged split annular cell in a closed position.

Referring to FIGS. 23A and 23B, in one embodiment, the split half packs 10 and 12 are connected by a hinge 150. Hinge 150 allows the half pack to be easily placed onto a downhole tool and further makes the battery pack one piece. FIGS. 23A and 23B show the hinged half packs open and closed respectively.

The foregoing description has concentrated on battery cells for placement in the chambers of the split annular pack. However, use of the split annular pack is not limited to housing a battery cell. To the contrary, in many applications it would be desirable for the chambers to house various types of electronic circuitry including, for example, control circuitry, data recording circuitry, and electronic sensors. Thus, the term "electrical device" as used herein refers to any type of electrical device that may be housed in the chambers, including but not limited to a battery cell, control circuitry, data recording circuitry, electronic sensors, etc.

When electronic devices other than battery cells are housed in the chambers, it is typically desired that they be mounted within the chamber in a secure fashion so as to prevent movement. Secure mounting of the electrical device may be achieved using an adhesive such as epoxy or by mechanical means such as screws or rivets.

The invention has many distinct advantages over conventional designs. The annular cell in accordance with an embodiment of the invention can fit in smaller annular widths and yet has a higher capacity than a comparable cylindrical cell of the same OD. The annular shape of a cell in accordance with an embodiment of the invention efficiently fills the annular space available. Split annular and annular cells in accordance with embodiments of the invention require fewer cells for given capacity, which reduces the number of necessary connections. Thus, the reliability of the battery pack is increased.

While the invention has been described with respect to a limited number of exemplary embodiments, those skilled in the art will appreciate numerous variations therefrom without departing from the spirit and scope of the invention. For example, while the exemplary electrode configuration is depicted in anode-cathode ("AC") form, the invention is equally applicable to a plurality of anode and cathode configurations or a spiral wrap. Also, in the above configuration, the post of the glass-to-metal seal is at a positive potential and the walls of the cell are at a negative potential (as shown in FIG. 20). This configuration may be reversed to place the walls of the cell at a positive potential and the post of the glass-to-metal seal at a negative potential (as shown in FIGS. 21 & 22). Further, it is to be understood that in any of the various embodiments any one or more of the segments may house types of electrical devices; including, but not limited to a power source, circuitry, or a sensor. Thus, the disclosed embodiments are for purposes of explanation and example only; the scope of the invention being defined solely by the appended claims.

What is claimed is:

1. A power cell for mounting in an annular pack for providing power to a downhole tool, comprising:
    a housing being curved along its longest dimension to at least partially conform to a chamber in the annular pack;
    battery means for generating electricity disposed within the housing; and
    a seal element arranged to provide a passage for electricity from the battery means through the housing.

2. The power cell of claim 1, further comprising a strain relief tab within the housing for electrically connecting the battery means to the seal element.

3. The power cell of claim 1, wherein the seal element comprises a glass seal integrally mounted in the cell.

4. The power cell of claim 3, further comprising a lid, wherein the glass seal is integrally mounted in the lid.

5. The power cell of claim 1, wherein the seal element comprises a glass-to-metal seal with a chamfered rim.

6. The power cell of claim 1, further comprising a spring for biasing the battery means to one side of the housing while under downhole conditions.

7. The power cell of claim 6, wherein the spring is a C-shaped spring.

8. The power cell of claim 1, wherein the battery means is one or more annular cells.

9. The power cell of claim 1, wherein the battery means is one or more cylindrical cells.

10. The power cell of claim 1, wherein the battery means comprises one or more annular cells and one or more cylindrical cells.

11. The power cell of claim 10, wherein the one or more annular cells and the one or more cylindrical cells are connected in series.

12. The power cell of claim 10, wherein the one or more annular cells and the one or more cylindrical cells are connected in parallel.

13. The power cell of claim 10, wherein the one or more annular cells and the one or more cylindrical cells are connected in parallel and in series.

14. The power cell of claim 1, wherein the battery means is secured within the housing with an epoxy.

15. The power cell of claim 1, wherein the chamber generally has at least a partially annular shape and the housing generally conforms to the shape.

16. The power cell of claim 1, wherein the battery means generates the power for the downhole tool.

17. The power cell of claim 1, wherein the chamber generally has at least a partially arcuate shape and the housing generally conforms to the shape.

18. An apparatus for mounting in an annular pack for providing power to a downhole tool, the apparatus comprising:
one or more battery packs for generating electricity disposed within the annular pack, each of said one or more battery packs having a curved elongation;
a seal element arranged to provide a passage for electricity from the one or more battery packs through the annular pack.

19. The apparatus of claim 18, wherein the one or more battery packs comprise one or more annular cells.

20. The apparatus of claim 18, wherein the one or more battery packs comprise one or more cylindrical cells.

21. The apparatus of claim 18, wherein the one or more battery elements comprise one or more annular cells and one or more cylindrical cells.

22. The apparatus of claim 18, wherein the seal element comprises a glass seal integrally mounted in the one or more battery packs.

23. The apparatus of claim 18, wherein the seal element comprises a glass seal integrally mounted in the annular pack.

24. The apparatus of claim 18, wherein the seal element comprises a glass-to-metal seal with a chamfered rim.

25. The apparatus of claim 18, wherein the one or more battery elements are biased by a spring.

26. The apparatus of claim 18, wherein the one more battery elements are secured by an epoxy.

27. The apparatus of claim 18, wherein the chamber generally has at least a partially annular shape and each of said one or more battery packs conforms to the shape.

28. The apparatus of claim 18, wherein said one or more battery packs generates the power for the downhole tool.

* * * * *